United States Patent [19]

Norton

[11] Patent Number: 4,503,912
[45] Date of Patent: Mar. 12, 1985

[54] PROCESS FOR CONFORMANCE CONTROL USING A POLYMER FLOCCULATE

[75] Inventor: Charles J. Norton, Denver, Colo.

[73] Assignee: Marathon Oil Company, Findlay, Ohio

[21] Appl. No.: 503,994

[22] Filed: Jun. 13, 1983

[51] Int. Cl.$^3$ .......................................... E21B 33/138
[52] U.S. Cl. ..................................... 166/295; 166/300
[58] Field of Search ................ 166/270, 294, 295, 300

[56] References Cited

U.S. PATENT DOCUMENTS

| | | | |
|---|---|---|---|
| 3,762,476 | 10/1973 | Gall | 166/294 |
| 3,809,160 | 5/1974 | Routson | 166/294 |
| 3,949,811 | 4/1976 | Threlkeld et al. | 166/294 |
| 3,952,806 | 4/1976 | Trantham | 166/295 X |
| 3,981,363 | 9/1976 | Gall | 166/294 X |
| 4,009,755 | 3/1977 | Sandiford | 166/295 X |
| 4,120,361 | 10/1978 | Threlkeld et al. | 166/295 X |
| 4,290,485 | 9/1981 | Free et al. | 166/295 X |

Primary Examiner—George A. Suchfield
Attorney, Agent, or Firm—Jack L. Hummel; Rodney F. Brown

[57] ABSTRACT

An aqueous solution containing a water soluble polymer and a nonalkaline aqueous solution containing a polyvalent cation are sequentially injected into the relatively highly permeable zones of a subterranean formation. The solutions preferentially enter the relatively highly permeable zones and form a flocculate in situ when the polymer and cation contact and mix in the connate water. Sequential injection may be repeated several times until the permeability of the relatively highly permeable zones is substantially reduced thereby improving conformance in the subterranean formation.

13 Claims, No Drawings

PROCESS FOR CONFORMANCE CONTROL USING A POLYMER FLOCCULATE

DESCRIPTION

TECHNICAL FIELD

The invention relates to a process for reducing the permeability of highly permeable zones in a subterranean formation using an in situ produced polymer flocculate.

BACKGROUND ART

Fluids preferentially migrate into high permeability zones relative to low permeability zones in subterranean formations. This migration is undesirable when injecting treatment fluids into hydrocarbon-bearing formations for post-primary recovery of residual hydrocarbons. The treatment fluids channel through the relatively highly permeable zones bypassing the adjacent relatively less permeable zones. The result is poor conformance and undesirable flow profiles of the treatment fluid in the formation. Consequently, the hydrocarbons residing in the less permeable zones are not produced and the overall yield of hydrocarbons from the formation is reduced.

A solution to this problem is to improve conformance in the formation by reducing the permeability of the highly permeable zones so that treatment fluids are diverted away from the zones of reduced permeability into adjacent hydrocarbon-bearing zones, thereby facilitating recovery of hydrocarbons from the formation.

A number of processes are known for reducing the permeability of highly permeable zones in subterranean hydrocarbon-bearing formations. Polymer gels are often used as permeability reducing compositions in highly permeable zones. For example, high molecular weight polymers are injected into a formation along with a cross-linking agent. The agent cross links the polymers in situ to form a viscous, permeability reducing polymer gel. Gelation may be delayed until the injected fluids are in place by spaced sequential injection of the gel components or complexing the cross-linking agent with a retarding anion or in a redox system.

U.S. Pat. No. 4,039,029 to Gall teaches complexing a multivalent cation cross-linking agent with a retarding anion. The complex prevents gelation of the polymer during injection until the complex dissociates in the formation. "Control of Water Mobility Using Polymers and Multivalent Cations" by Needham et al, SPE Paper No. 4747, injects partially hydrolyzed polyacrylamide with aluminum citrate. The citrate sequesters the aluminum cation until the gel components are in place in the formation. The aluminum cation is freed from the complex over time to cross link the polymer. The resulting gel reduces the permeability of the porous media to water.

The complexing mechanisms used in situ to delay gelation are ineffective because the complexes are extremely sensitive to formation conditions, i.e. temperature and pH. If the formation conditions are unfavorable, the cross-linking agent is not released from the complex in a reactive form and is incapable of producing a permeability reducing gel. Therefore it is difficult to create a stable gel which effectively reduces permeability in highly permeable subterranean zones using these methods.

Spaced sequential injection of polymer and cross-linking agent has also been shown to be ineffective because the gel components are displaced radially away from the well bore during injection by the spacer fluids. Gelation occurs too remotely from the well bore to effectively reduce permeability and control conformance in the formation.

There are other problems associated with using gels as permeability reducing compositions. It is difficult to create a partial plug with a gel because the gel is a continuous phase of uniform viscosity. A gel tends to either produce total shut-off of the formation or have no effect on permeability at all. Furthermore gels are often unstable at formation conditions of high temperature and varying pH.

The prior art also teaches conformance control in subterranean hydrocarbon-bearing formations using solid precipitates produced in situ. Metal hydroxide precipitates are created by contacting a polyvalent cation with a caustic solution in situ. The resulting precipitate reduces permeability in the formation as it settles out of solution in the porous zones to partially or completely plug them.

A simplified process is needed for reducing permeability in highly permeable zones of the formation, which minimizes the number of components and reactions required to effectively reduce permeability. A process is needed which allows the practitioner to implement either complete or partial plugging of the zones by reacting injected fluids in situ. It is desired that the reaction be rapid and relatively insensitive to formation temperature and pH and produces a stable permeability, reducing composition, which is not readily displaced during subsequent water flooding.

DISCLOSURE OF INVENTION

The present invention provides a process for selectively reducing permeability in relatively highly permeable zones in a subterranean hydrocarbon-bearing formation. An aqueous solution containing a water soluble polymer and a non-alkaline aqueous solution containing a polyvalent cation are injected into a highly permeable zone. The two solutions are separated from each other during injection by an aqueous spacer. The non-alkalinity of the cation containing solution improves the solubility of the cation and prevents undesirable precipitation of the cation with naturally occurring hydroxides present in the connate water. The solutions preferentially enter the highly permeable zones. A flocculate forms in situ when the polymer and cation contact in the connate water and mixing occurs between the polymer, cation, and connate water. Solid floccules occupy the pore spaces of the highly permeable zones and reduce the permeability therein by displacing the more mobile fluid from these zones. Sequential injections may be repeated several times to increase the amount of flocculate produced until the desired pressure buildup or shut-off is obtained. The resulting flocculate is not displaced by subsequent water flooding or other treatment processes. The flocculate thereby effectively controls the conformance of the formation and diverts subsequently injected treatment fluids into the hydrocarbon-bearing zones of the formation for improved hydrocarbon recovery.

BEST MODE FOR CARRYING OUT THE INVENTION

The present invention relates to a process for reducing the permeability in relatively highly permeable zones within a subterranean hydrocarbon-bearing formation containing relatively less permeable zones using a polymer flocculate. The process comprises sequential injection of an aqueous solution containing a high molecular weight, water soluble polymer and a non-alkaline aqueous solution containing a polyvalent cation into a highly permeable zone via a well in fluid communication therewith. The polymer reacts with the cation in situ to form a polymer flocculate, which remains in the pores of the relatively highly permeable zone. Repeated sequential injections of the polymer and cation solutions may be employed to produce additional flocculate to achieve increasing permeability reduction up to shut-off of the highly permeable zone.

The polymer is preferably a water soluble, partially hydrolyzed polyacrylamide wherein up to about 40% of the total amide and carboxylate groups of the polyacrylamide are carboxylate groups and preferably about 5 to about 40% are carboxylate groups. The partially hydrolyzed polyacrylamide may be obtained using methods well known in the art either by converting the amide groups to carboxylate or alternatively by copolymerizing a mixture of acrylamide and acrylic acid. The polyacrylamide has a molecular weight of from about 100,000 to about 10 million and preferably about 1 million to about 6 million. The polyvalent cation is preferably a trivalent cation such as $Al^{3+}$, $Fe^{3+}$ and $Cr^{3+}$. However, essentially any polymer and cation can be used in this process which are capable of forming a polymer flocculate.

The polymer and polyvalent cation solutions are injected as separate and discrete aqueous slugs. The two slugs may be separated by a water spacer of about 0.01 to 1 pore volumes. The aqueous medium used in the slugs and the spacer may be fresh water or a brine. The aqueous solution containing the trivalent cation is maintained at a non-alkaline pH of from about 7 to about 5. The order in which the slugs are injected is not critical.

The concentration of components in the slug is such that the equivalents of polyvalent cation in the solution is stoichiometric to or in excess of the equivalents of the reactive groups of the polymer. Where the polymer is partially hydrolyzed polyacrylamide, the carboxylate groups are the reactive groups. The concentration of polymer in the injected slug is in the range of from about 250 ppm to about 10,000 ppm and preferably about 2500 ppm to about 7500 ppm. The concentration of polyvalent cation is likewise from about 40 ppm to about 1600 ppm and preferably from about 400 ppm to about 1200 ppm. Of course the cation concentration can be substantially above this range to achieve a stoichiometric excess of polyvalent cations in the slug.

The slugs are injected into the highly permeable zones in a well in fluid communication with the zones. The injected fluids preferentially enter the highly permeable zones, although packers may be used to create zone isolation, ensuring that the injected fluids enter the highly permeable zones. The injection rate and amount of materials to be injected is dependent on the geology of the formation into which the fluids are injected. The skilled artisan can readily fix the values for the process parameters of amount and concentration of materials to be injected based on the desired degree of permeability reduction to be obtained in the formation and the character of the formation.

The process may be applied to most subterranean formations containing at least one relatively highly permeable zone and at least one relatively less permeable zone. The process is most effective when the highly permeable zone is separated from the less permeable zone by a relatively impermeable zone. However, the process may also be practiced where the relatively highly permeable zone is vertically bounded by the relatively less permeable zone.

The mechanism for flocculate formation is not precisely known, but it is believed that the polymer flocculate is formed by a reaction between the trivalent cations and the carboxylate groups of the polymer. Where there is a high concentration of cations, the cations tend to compete for sites on the polymer, each cation linking up with only one or a relatively few number of polymers. Therefore a flocculate forms rather than a gel containing a large network of cross-linked polymers. The resulting polymer flocculate is a relatively large fluffy white particle, which settles out of the solution.

Polyvalent cationic hydroxide precipitates form under alkaline conditions. Therefore it is necessary that the polyvalent cation be dissolved in a non-alkaline solution so that the polyvalent cation does not preferentially precipitate out as a hydroxide precipitate. Acidification of the polyvalent cation solution ensures that the polyvalent cation remains in solution until it contacts the polymer rather than precipitating out as the smaller less effective hydroxide precipitate. Flocculation of the polyvalent cations and the polymer is promoted once the polymer contacts the cation by gradual mixing between them and the alkaline connate water.

The following example is illustrative of the present invention and is not to be construed as limiting the scope thereof.

EXAMPLE

A cylinder 10.7 cm long and 3.95 cm in diameter is packed with a sawing grade Ottawa Sand wetted with tap water. The sand pack has an estimated pore volume of 120 $cm^3$. Tap water is pumped through the sand pack at a constant pressure and a flow rate of 4.65 $cm^3$ per minute. Alternating sequences of a solution containing partially hydrolyzed polyacrylamide (PHPA) at a concentration of 5000 ppm and a solution of $Al_2(SO_4)_3$ at a concentration of 6400 ppm are pumped through the sand pack in amounts as shown in Table 1 below. The initial permeability $k_i$ is calculated to be 2179 md from the initial pressure drop. The final permeability $k_f$ is 72.6 md. The percent permeability reduction in the sand pack using the process of the instant invention is 96.7%.

TABLE 1

| Slug Composition | Slug Volume ($cm^3$) | Pressure Drop (psi) |
|---|---|---|
| PHPA | 125 | Initially 0.15 |
| Tap Water | 5 | |
| $Al_2(SO_4)_3$ | 50 | |
| Tap Water | 5 | |
| PHPA | 50 | |
| $Al_2(SO_4)_3$ | 10 | |
| PHPA | 10 | |
| $Al_2(SO_4)_3$ | 10 | |
| PHPA | 10 | |
| $Al_2(SO_4)_3$ | 10 | |
| PHPA | 10 | |
| $Al_2(SO_4)_3$ | 10 | |

TABLE 1-continued

| Slug Composition | Slug Volume (cm³) | Pressure Drop (psi) |
|---|---|---|
| PHPA | 10 | |
| Al$_2$(SO$_4$)$_3$ | 10 | |
| PHPA | 10 | |
| Al$_2$(SO$_4$)$_3$ | 10 | |
| PHPA | 10 | |
| Al$_2$(SO$_4$)$_3$ | 10 | |
| PHPA | 10 | |
| Allowed to stand overnight | — | |
| Tap Water | 125 | 4–5 Final |

While the foregoing preferred embodiment of the invention has been described and shown, it is understood that the alternatives and modifications, such as those suggested and others, may be made thereto and followed in the scope of the invention.

What is claimed is:

1. A process for reducing permeability in at least one relatively highly permeable zone of a subterranean formation also containing at least one relatively less permeable zone, said formation penetrated by a well in fluid communication therewith, the process comprising the sequential steps of:
   (a) injecting an aqueous solution containing a high molecular weight, water soluble, organic polymer into said at least one relatively highly permeable zone via said well whereby said polymer substantially penetrates said at least one relatively highly permeable zone; and
   (b) injecting via said well a slightly acidic aqueous solution containing a polyvalent cation in at least a stoichiometric amount relative to the reactive groups of said polymer into said at least one relatively highly permeable zone penetrated by said polymer wherein said cation contacts said polymer to produce a flocculate in situ, which substantially reduces the permeability of said at least one relatively highly permeable zone.

2. The process of claim 1 wherein steps (a) and (b) are repeated at least once.

3. The process of claim 2 wherein steps (a) and (b) are repeated until said at least one relatively highly permeable zone is substantially shut-off.

4. The process of claim 1 wherein an aqueous spacer is injected into said at least one relatively highly permeable zone between said aqueous solution containing said polymer and said aqueous solution containing said polyvalent cation.

5. The process of claim 1 wherein said polyvalent cation is a trivalent cation.

6. The process of claim 5 wherein said trivalent cation is selected from the group consisting of $Al^{3+}$, $Cr^{3+}$ and $Fe^{3+}$.

7. The process of claim 1 wherein said polymer is partially hydrolyzed polyacryamide.

8. The process of claim 7 wherein up to about 40% of the total amide and carboxylate groups of said partially hydrolyzed polyacrylamide are carboxylate groups.

9. The process of claim 1 wherein the pH of said slightly acidic aqueous solution containing said cation is from about 5 to about 7.

10. The process of claim 1 wherein said at least one relatively highly permeable zone is vertically bounded by said at least one less permeable zone.

11. The process of claim 1 wherein said at least one relatively highly permeable zone is separated from said at least one less permeable zone by a relatively impermeable zone.

12. The process of claim 1 wherein said formation contains an alkaline connate water and wherein said polymer, cation and connate water mix.

13. The process of claim 1 wherein said subterranean formation is a hydrocarbon-bearing formation.

* * * * *